(12) United States Patent
Yano et al.

(10) Patent No.: US 11,205,091 B2
(45) Date of Patent: Dec. 21, 2021

(54) OBJECT INFORMATION REGISTRATION APPARATUS AND OBJECT INFORMATION REGISTRATION METHOD

(71) Applicant: Hitachi, Ltd., Tokyo (JP)

(72) Inventors: Taiki Yano, Tokyo (JP); Nobutaka Kimura, Tokyo (JP); Nobuhiro Chihara, Tokyo (JP); Fumiko Beniyama, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/834,087

(22) Filed: Mar. 30, 2020

(65) Prior Publication Data

US 2020/0342256 A1 Oct. 29, 2020

(30) Foreign Application Priority Data

Apr. 23, 2019 (JP) .............................. JP2019-081702

(51) Int. Cl.
*G06K 9/00* (2006.01)
*G06K 9/62* (2006.01)

(52) U.S. Cl.
CPC ......... *G06K 9/6215* (2013.01); *G06K 9/6261* (2013.01); *G06K 9/6262* (2013.01)

(58) Field of Classification Search
CPC ...... G06K 9/4609; G06K 9/48; G06K 9/6407; G06K 9/2009; G06K 9/6423; G06K 9/6215; G06K 9/6262; G06K 9/6261; G06T 7/0083; G06T 7/0081; G06T 7/001; G06T 2207/10016; G06F 17/30249; G11B 27/28

See application file for complete search history.

(56) References Cited

U.S. PATENT DOCUMENTS

| | | | | | |
|---|---|---|---|---|---|
| 3,925,760 A | * | 12/1975 | Mason | ................ | G06K 9/2009 382/310 |
| 4,589,140 A | * | 5/1986 | Bishop | ................ | G01R 31/308 348/130 |
| 5,485,531 A | * | 1/1996 | Ichinohe | ............. | G06K 9/4609 382/198 |
| 5,554,983 A | * | 9/1996 | Kitamura | ................ | G08G 1/04 340/905 |
| 5,590,220 A | * | 12/1996 | Takahashi | ............... | G06K 9/48 382/199 |
| 5,757,287 A | * | 5/1998 | Kitamura | ................ | G08G 1/04 340/934 |

(Continued)

FOREIGN PATENT DOCUMENTS

JP 2018-156517 A 10/2018

*Primary Examiner* — Amir Alavi
(74) *Attorney, Agent, or Firm* — Mattingly & Malur, PC (57) ABSTRACT

An object information registration apparatus that registers information of a first object that is a reference object of object recognition holds a first object image that is an image of the first object and recognition method information related to the first object, selects one or more partial regions included in the first object image, sets a recognition method corresponding to each of the one or more partial regions, acquires feature information of each of the one or more partial regions from the first object image based on the set recognition method, and stores the one or more partial regions, the set recognition method, and the acquired feature information in the recognition method information in association with each other.

9 Claims, 10 Drawing Sheets

(56) References Cited

U.S. PATENT DOCUMENTS

| | | | | |
|---|---|---|---|---|
| 6,393,151 B1* | 5/2002 | Yamamoto | ............... | G06K 9/48 |
| | | | | 382/198 |
| 6,434,257 B1* | 8/2002 | Mohan | ................. | G01B 11/024 |
| | | | | 348/89 |
| 7,200,270 B2* | 4/2007 | Yamaguchi | .......... | G06K 9/6211 |
| | | | | 382/224 |
| 9,070,008 B2* | 6/2015 | Tanaka | ............... | G06K 9/00926 |
| 2018/0276460 A1 | 9/2018 | Kawano | | |
| 2019/0303650 A1* | 10/2019 | Liu | ...................... | G06K 9/6202 |
| 2020/0342256 A1* | 10/2020 | Yano | ................... | G06K 9/6262 |

* cited by examiner

```
Model1:
  - name: "seal"
    method: "template"
    rotation: 20
    position: [0.01, 0.01]
    margin_pos: 0.05
    width: 200
    height: 50
    data: "template.png"
  - name: "barcode"
    method: "none"
    position: [0.1, 0.1]
    margin_pos: 0.05
    width: 150
    height: 150
```

FIG. 9

```
Model2:
-     origin: [[0, 0], [0.25, 0.15]]
   - [[0.08, 0.01], [0.12, 0.04]]
     name: "logo"
     method: "keypoint"
     threshold_pos: 0.002

- [[0.15, 0.08], [0.24, 0.14]]
     name: "product_info"
        - [[0.15, 0.08], [0.2, 0.12]]
          name: "barcode"
          method: "scan"
        - [[0.2, 0.08], [0.24, 0.1]]
          name: "size"
          method: "ocr"
```

OBJECT INFORMATION REGISTRATION APPARATUS AND OBJECT INFORMATION REGISTRATION METHOD

CLAIM OF PRIORITY

The present application claims priority from Japanese patent application JP2019-081702 filed on Apr. 23, 2019, the content of which is hereby incorporated by reference into this application.

BACKGROUND OF THE INVENTION

1. Field of the Invention

The present invention relates to an object information registration apparatus and an object information registration method.

2. Description of the Related Art

As a related art in this technical field, there is JP 2018-156517 A. This publication describes that "A characteristic point detection part 203 detects a characteristic point of an image. A natural region classification part 204 classifies a region in an image into a plurality of regions which are different in attributes. A priority regulation storage part 205 stores a priority regulation for making an attribute of the region in the image and the priority of the region associated with each other. A similarity determination part 209 collates the characteristic point which is detected with respect to two images, and determines the similarity of the two images. The similarity determination part 209 reflects the priority of the region which is associated with the attribute of the region including the characteristic point by the priority regulation to a result of the collation of the characteristic point, and determines the similarity." (see abstract).

SUMMARY OF THE INVENTION

In the technique described in JP 2018-156517 A, switching of a recognition method in each of a plurality of regions in an image is not considered. Also, for example, even in the same object, the respective characteristics of the plurality of regions may be different such that an error of having different inclinations is likely to occur in a certain region, and an error of having different sizes is likely to occur in different regions. Therefore, in such a case, the technique described in JP 2018-156517 A may determine that the similarity is not high even for the same object. Therefore, an object of one embodiment of the present invention is to generate information for accurately determining that, even when characteristics of partial regions in an object are different, the object and another object are the same or similar.

In order to solve the above problem, one embodiment of the present invention employs the following configuration. An object information registration apparatus that registers information of a first object that is a reference object of object recognition includes: a processor; and a memory. The memory holds a first object image that is an image of the first object and recognition method information related to the first object. The processor selects one or more partial regions included in the first object image, sets a recognition method corresponding to each of the one or more partial regions, acquires feature information of each of the one or more partial regions from the first object image based on the set recognition method, and stores the one or more partial regions, the set recognition method, and the acquired feature information in the recognition method information in association with each other.

According to one embodiment of the present invention, even when the characteristics of each partial region in the object are different, it is possible to generate the information for accurately determining that the object and another object are the same or similar.

Problems, configurations, and effects other than those described above will be clarified by the following description of embodiments.

DESCRIPTION OF THE PREFERRED EMBODIMENTS

Hereinafter, embodiments of the present invention will be described in detail with reference to the drawings. In this embodiment, the same components are given the same reference numerals in principle, and the repeated description is omitted. It should be noted that this embodiment is merely an example for realizing the present invention, and does not limit the technical scope of the present invention.

First Embodiment

Figure 1:
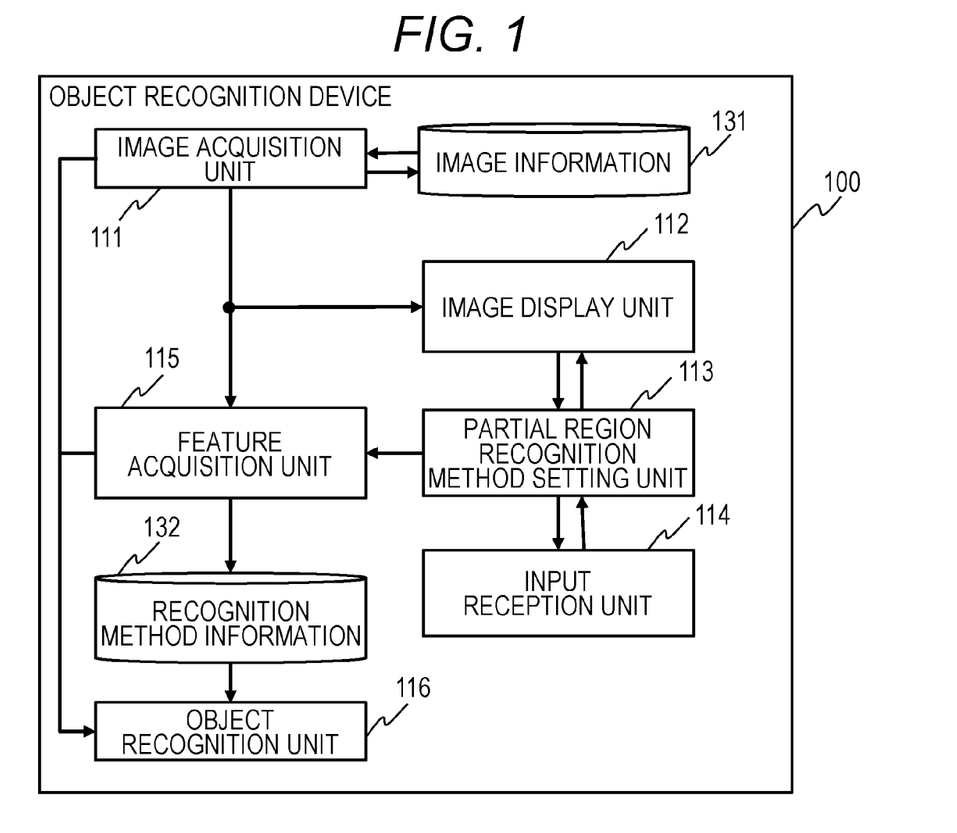
FIG. 1 is a block diagram illustrating a functional configuration example of an object recognition device according to a first embodiment.

FIG. 1 is a block diagram illustrating a functional configuration example of an object recognition device. An object recognition device 100 registers an image of a teaching object that is a reference object for object recognition. The object recognition device 100 selects partial regions included in a teaching object image, and sets a recognition method for each of the selected partial regions. The object recognition device 100 acquires an image of a recognition target object to be determined whether or not an object is the same as or similar to the teaching object. The object recognition device acquires a partial region from the image of the recognition target object, and determines whether or not the recognition target object is an object which is the same as or similar to the teaching object by comparing the partial regions of the teaching object and the recognition target object by a recognition method corresponding to the partial regions.

The object recognition device 100 includes an image acquisition unit 111, an image display unit 112, a partial region recognition method setting unit 113, an input reception unit 114, a feature acquisition unit 115, and an object recognition unit 116. The image acquisition unit 111 acquires a teaching object image and a recognition target object image. The image display unit 112 displays an image on an output device 150 based on an instruction from each functional unit. The partial region recognition method setting unit 113 selects a partial region of the teaching object, and sets a recognition method for the selected partial region. The input reception unit 114 receives input information from a user or the like via the input device 140.

The feature acquisition unit 115 acquires feature information (for example, feature amounts and feature vectors) in the selected partial region based on the set recognition method. The object recognition unit 116 determines whether the teaching object and the recognition target object are the same or similar by comparing the partial regions of the teaching object and the recognition target object based on the set recognition method.

In addition, the object recognition device 100 holds image information 131 and recognition method information 132. The image information 131 includes a teaching object image, an image of a partial region of the teaching object, and a recognition target object image. The recognition method information 132 includes a selected partial region of the teaching object, and a recognition method and parameters corresponding to the partial region.

Figure 2:
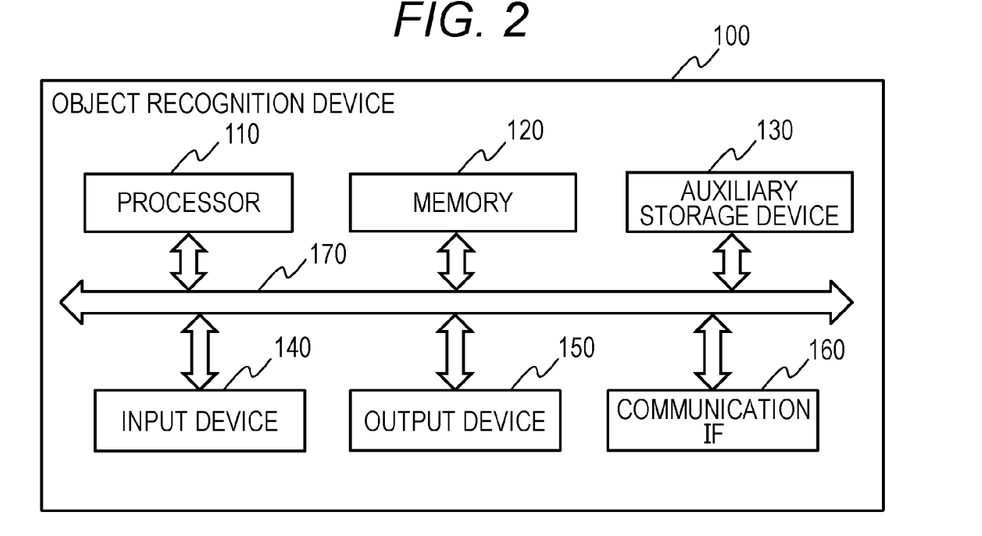
FIG. 2 is a block diagram illustrating a hardware configuration example of the object recognition device according to the first embodiment.

FIG. 2 is a block diagram illustrating a hardware configuration example of the object recognition device 100. The object recognition device 100 includes, for example, a processor 110, a memory 120, an auxiliary storage device 130, an input device 140, an output device 150, and a communication interface (IF) 160, and is configured by computers connected by an internal communication line 170 such as a bus.

The processor 110 executes a program stored in the memory 120. The memory 120 includes a read only memory (ROM) as a nonvolatile storage element and a random access memory (RAM) as a volatile storage element. The ROM stores invariable programs (for example, basic Input/Output system (BIOS)). The RAM is a high-speed and volatile storage element such as a dynamic random access memory (DRAM), and temporarily stores a program executed by the processor 110 and data used when the program is executed.

The auxiliary storage device 130 is, for example, a large-capacity and nonvolatile storage device such as a magnetic storage device (Hard Disk Drive (HDD)), a flash memory (Solid State Drive (SSD)), and stores the program executed by the processor 110 and the data used when the program is executed. That is, the program is read from the auxiliary storage device 130, loaded into the memory 120, and executed by the processor 110.

The input device 140 is a device that receives an input from an operator, such as a keyboard and a mouse. The output device 150 is a device, such as a display device or a printer that outputs the execution result of the program in a format that is visible to the operator. The communication IF 160 is a network interface device that controls communication with another device according to a predetermined protocol.

The program executed by the processor 110 is provided to the object recognition device 100 via a removable medium (such as a CD-ROM and a flash memory) or a network, and is stored in the nonvolatile auxiliary storage device 130 that is a non-temporary storage medium. For this reason, the object recognition device 100 may have an interface for reading data from a removable medium.

The object recognition device 100 is a computer system configured on one computer physically or on a plurality of computers configured logically or physically, and may operate on separate threads on the same computer or operate on a virtual computer constructed on a plurality of physical computer resources. For example, the object recognition device 100 may not be a single computer, but may be divided into a teaching object registration device which is a computer that registers a teaching object and a recognition method for recognizing an object and a determination device which is a computer that determines whether or not an object using the set recognition method is the teaching object.

The processor 110 includes, for example, the image acquisition unit 111, the image display unit 112, the partial region recognition method setting unit 113, the input reception unit 114, the feature acquisition unit 115, and the object recognition unit 116, which are the above-described functional units.

For example, the processor 110 functions as the image acquisition unit 111 by operating according to the image acquisition program loaded into the memory 120, and functions as the image display unit 112 by operating according to the image display program loaded into the memory 120. The relationship between the program and the functional unit is the same for other functional units included in the processor 110.

A part or all of the functions of the functional units included in the processor 110 may be realized by hardware such as an application specific integrated circuit (ASIC) or a field-programmable gate array (FPGA).

The auxiliary storage device 130 holds, for example, the above-described image information 131 and recognition method information 132. Note that some or all of the information stored in the auxiliary storage device 130 may be stored in the memory 120, or may be stored in an external database or the like connected to the object recognition device 100.

In this embodiment, the information used by the object recognition device 100 may be represented by any data structure without depending on the data structure. In this embodiment, the information is represented in a table format. However, for example, a data structure appropriately selected from a list, a database, or a queue can store the information.

Figure 3:
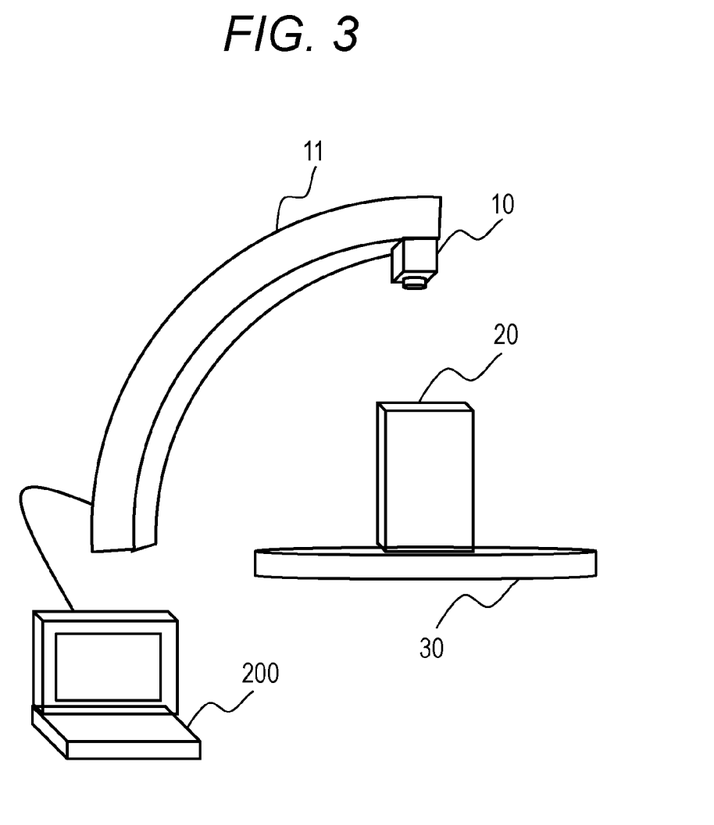
FIG. 3 is an example of a photographing system for photographing images of a teaching object and a recognition target object provided in the object recognition device according to the first embodiment.

FIG. 3 is an example of a photographing system that photographs images of the teaching object and the recognition target object provided to the object recognition device 100. The photographing system includes, for example, a camera 10, a turntable 30, and a terminal 200. The camera 10 photographs an object 20. The camera 10 is provided with, for example, an arm 11, and by operating the arm 11, the camera 10 can photograph from various positions and angles. The object 20 is a teaching object or a recognition target object.

The object 20 is mounted on a turntable 30. When the turntable 30 rotates or the arm 11 operates, the camera 10 can photograph the object 20 in various postures. The terminal 200 is a computer connected to the camera 10. The terminal 200 controls photographing by the camera 10 and operation of the arm 11. In addition, the terminal 200 acquires an image of the object 20 photographed by the camera 10. The terminal 200 may control the operation of the turntable 30.

Although not illustrated in FIG. 3, the terminal 200 is connected to the object recognition device 100 and transmits the acquired image of the object 20 to the object recognition device 100. Note that the terminal 200 may control the camera 10, the arm 11, and the turntable 30 according to an instruction from the object recognition device 100. Further, the object recognition device 100 and the terminal 200 may be integrated.

Figure 4:
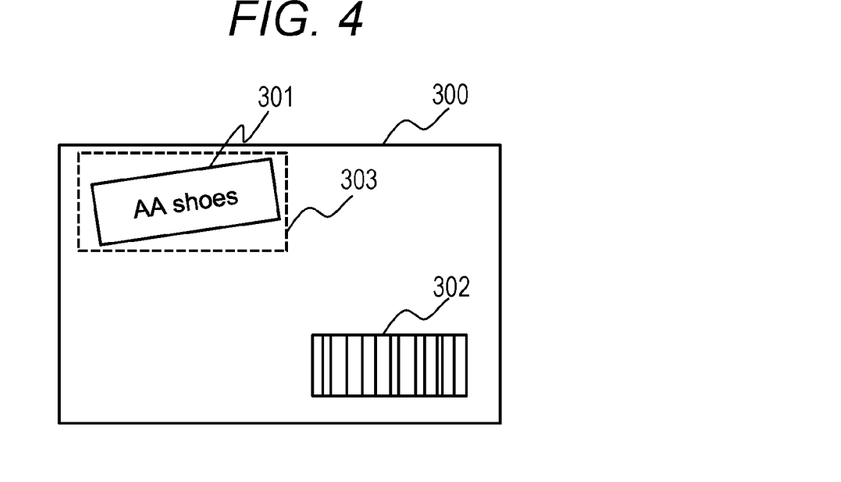
FIG. 4 is an explanatory diagram illustrating an example of the teaching object according to the first embodiment.

FIG. 4 is an explanatory diagram illustrating an example of the teaching object. In the example of FIG. 4, the teaching object 300 is a box in which shoes are stored, and an image of one side of the box is used as the teaching object image. A seal 301 is attached to the teaching object 300, and product information 302 is described. Since the seal 301 is attached to the box by, for example, a manual operation of a human, even if the object is the same as the teaching object 300, a large error may occur in the position and the posture of the seal 301.

Therefore, if object recognition is executed without considering the error of the seal 301 attached to the teaching object 300, due to the error, there is a risk that an object cannot be recognized as the same or similar object although the object is the same as the teaching object 300. Also, the product information 302 may have different detailed information such as a serial number although the object is the same as the teaching object 300, and thus the product information 302 is not suitable for partial regions used for object recognition.

Further, the teaching object 300 has few other feature points. Therefore, in the selection of the partial region described later, a recognition method that allows the error when the seal 301 is attached (that is, in consideration of the positional deviation or inclination) set to the partial region 303, so that the object recognition using the information of the seal 301 becomes possible.

Figure 5:
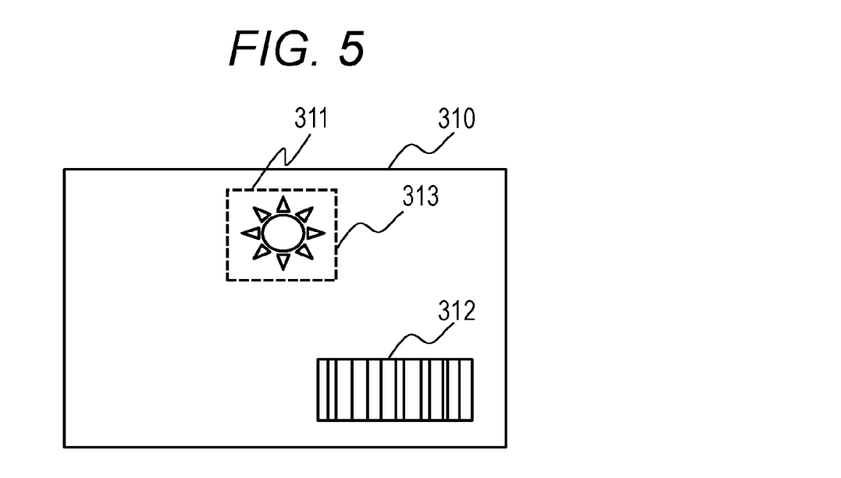
FIG. 5 is an explanatory diagram illustrating another example of the teaching object according to the first embodiment.

FIG. 5 is an explanatory diagram illustrating another example of the teaching object. In the example of FIG. 5, the teaching object 310 is a box in which shoes are stored, and an image of one side of the box is used as the teaching object image. On the teaching object 310, a logo 311 is drawn, and product information 312 is described. Even if the object is the same as the teaching object 300, the size of the logo 311 may be different.

Therefore, if object recognition is executed without considering the difference in the size of the logo 311 attached to the teaching object 310, due to the error, there is a risk that an object cannot be recognized as the same or similar object although the object is the same as the teaching object 310. Also, the product information 312 may have different detailed information such as a serial number although the object is the same as the teaching object 310, and thus the product information is not suitable for partial regions used for object recognition.

Further, the teaching object 310 has few other feature points. Therefore, in the selection of the partial region described later, a recognition method that allows the difference in the size of the logo 311 (that is, in consideration of the positional deviation or inclination) set to the partial region 313, so that the object recognition using the information of the logo 311 becomes possible.

As illustrated in FIGS. 4 and 5, by making it possible to set a recognition method and a parameter for each of a plurality of partial regions of the teaching object, it is possible to execute object recognition that absorbs a partial variation of a recognition target article.

Figure 6:
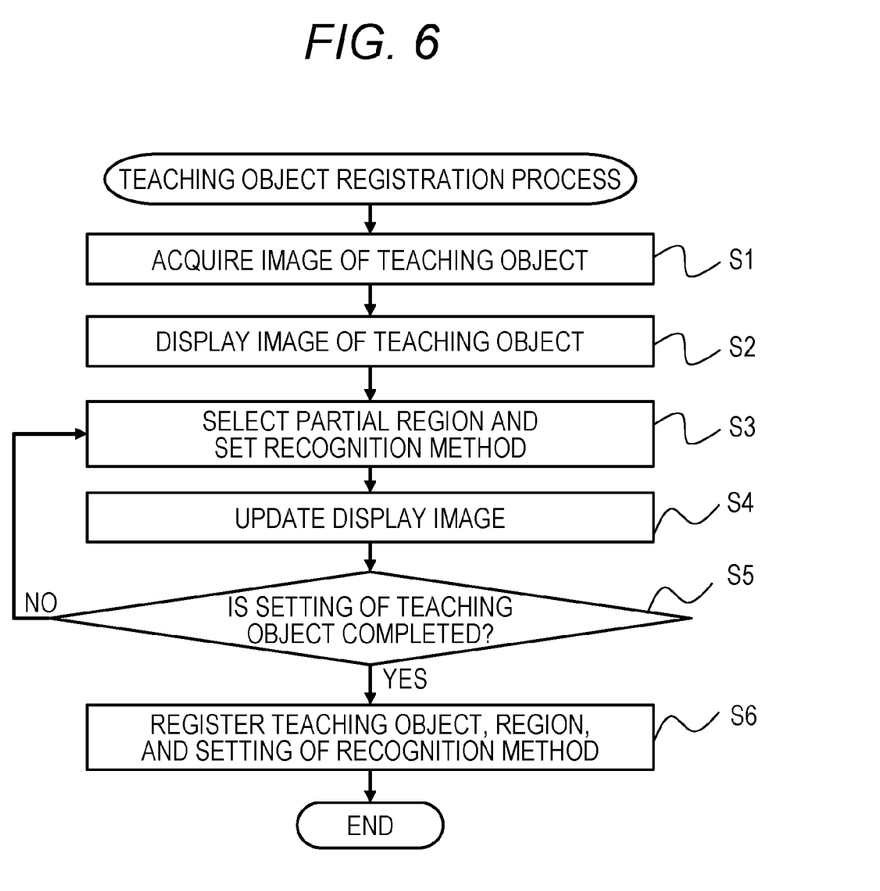
FIG. 6 is a flowchart illustrating an example of a teaching object registration process according to the first embodiment.

FIG. 6 is a flowchart illustrating an example of the teaching object registration process. The image acquisition unit 111 acquires an image of the teaching object from the terminal 200 (S1). Note that the image acquisition unit 111 may acquire images of a plurality of postures (for example, front, back, top, bottom, left side, right side, and the like) of the teaching object. Further, the image acquisition unit 111 stores the acquired image of the teaching object in the image information 131. Note that the image acquisition unit 111 may acquire an image stored in advance in the image information 131 as an image of the teaching object.

The image display unit 112 displays the image of the teaching object acquired in step S1 on the output device 150 (S2). Next, the partial region recognition method setting unit 113 selects a partial region used for object recognition of the teaching object and sets a recognition method for recognizing the partial region (S3). For example, in step S3, the input reception unit 114 receives the inputs of the partial region, the recognition method, and the like via the input device 140, and the partial region recognition method setting unit 113 sets the input partial region and recognition method and the like.

Subsequently, the image display unit 112 displays the partial region selected in step S3 and the set recognition method on the output device 150 (S4). The partial region recognition method setting unit 113 determines whether or not the setting of the teaching object is completed (S5). Specifically, the partial region recognition method setting unit 113 determines that the setting is completed, for example, when the completion of the setting is instructed via the input reception unit 114, and determines that the setting is not completed when the completion is not instructed.

When determining that the setting of the teaching object is not completed (S5: No), the partial region recognition method setting unit 113 returns to step S3. If the partial region recognition method setting unit 113 determines that the setting of the teaching object is completed (S5: Yes), the feature acquisition unit 115 acquires feature information of each partial region based on the set recognition method and parameters. Then, for example, the identification information of the teaching object image, the partial region, the recognition method, the parameter, and the feature information are stored in the recognition method information 132 in association with each other (step S6), and the teaching object registration process ends.

Figure 7:
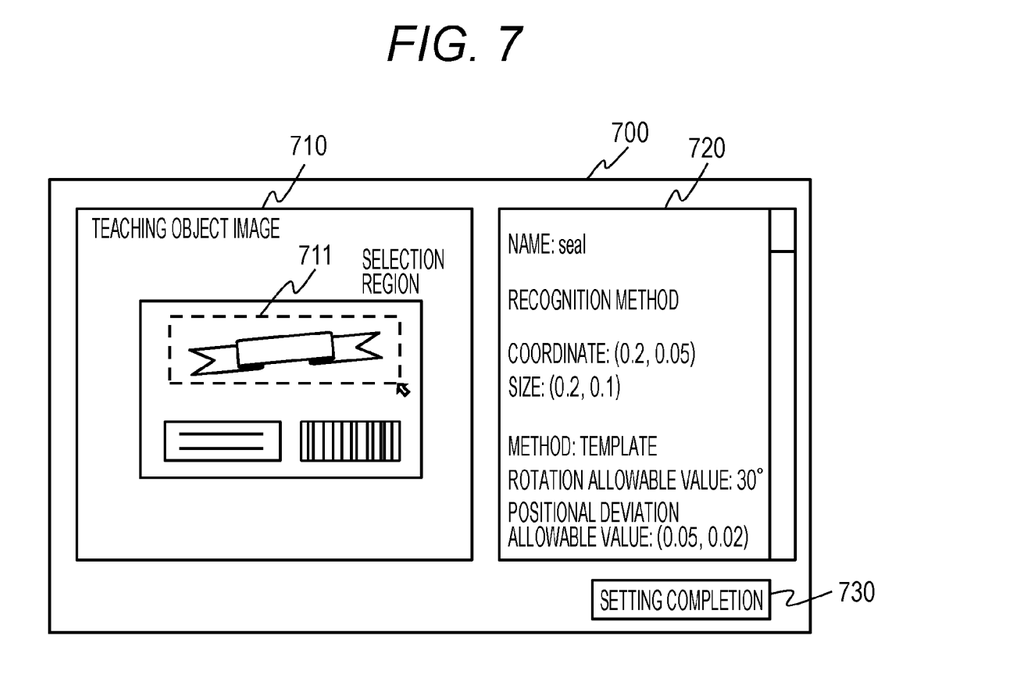
FIG. 7 is an example of a display screen for receiving selection of a partial region and setting of a recognition method according to the first embodiment.

FIG. 7 is an example of a display screen for receiving the selection of the partial region and the setting of the recognition method in step S3. The display screen 700 includes, for example, a teaching object image display region 710, a recognition method setting region 720, and a setting completion button 730. In step S2, the image of the teaching object is displayed in the teaching object image display region 710.

In the teaching object image display region 710, a selection region 711 for selecting a partial region for which a recognition method is set is displayed. For example, by dragging with a mouse, the selection region 711 having a predetermined shape (for example, a rectangle, a square, an ellipse, and a circle) is displayed, or the selection region 711 is displayed by specifying a shape and a coordinate value.

The recognition method setting region 720 is a region for setting a recognition method for the partial region selected in the selection region 711. The recognition method setting region 720 receives the input of the name of the partial region. In the example of FIG. 7, the name of the partial region is set to "seal".

The recognition method setting region 720 displays, for example, the coordinates and size of the partial region. In the recognition method setting region 720, a box or the like for selecting the recognition method is displayed. When the recognition method is selected, the selected recognition method and parameters used for the recognition method are displayed.

In the example of FIG. 7, the recognition method and the parameters are set in the recognition method setting region 720. In the example of FIG. 7, template recognition is selected as the recognition method, and the rotation allowable value and the positional deviation allowable value, which are parameters used in the template recognition, are set to 30° and (0.05, 0.02), respectively. When the setting completion button 730 is selected, the procedure transits to step S6.

When a plurality of partial regions are set for one teaching object, for example, it is possible to set whether to execute recognition processing for each partial region in parallel or in a hierarchical manner. For example, when the second or subsequent partial region is selected, it is possible to receive the input about whether the partial region is set in a parallel relationship with another selected partial region or the partial region is located in a higher or lower hierarchy of the selected partial region in the recognition method setting region 720.

Figure 8:
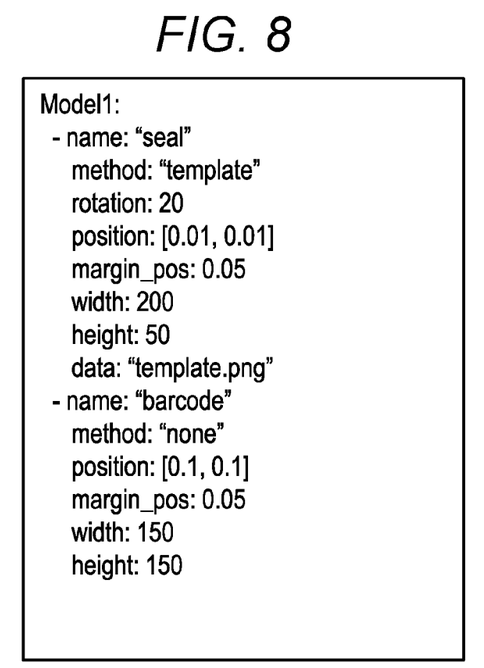
FIG. 8 is an example of recognition method data in which partial regions in the teaching object according to the first embodiment are described in parallel.

FIG. 8 is an example of recognition method data in which partial regions in the teaching object are described in parallel. The recognition method data is data indicating the partial region registered in the recognition method information 132 in step S6 and the recognition method, parameter, and feature information corresponding to the partial region. In the recognition method data of FIG. 8, two partial regions "seal" and "barcode" are registered in parallel. "method" in the recognition method data indicates the recognition method of the partial region, and items described below "method" and above "name" of the next partial region are parameters used for the recognition method, respectively.

Although details will be described later, when a plurality of partial regions are described in parallel in the recognition method data, the object recognition unit 116 calculates similarities between the plurality of partial regions of the recognition target object and the teaching object, and calculates an overall similarity based on the similarities. The object recognition unit 116 determines whether or not the recognition target object is the same as or similar to the teaching object based on the overall similarity, and thus can execute the object recognition in consideration of the similarities of the plurality of partial regions.

Figure 9:
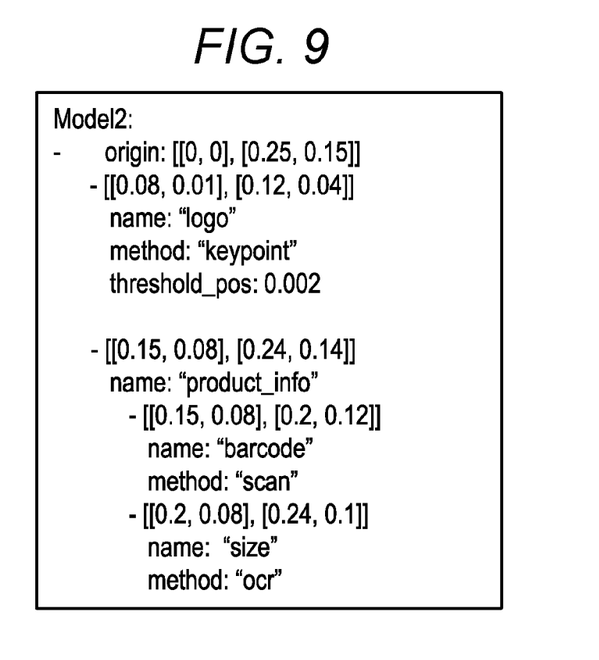
FIG. 9 is an example of recognition method data in which partial regions in the teaching object according to the first embodiment are described hierarchically.

FIG. 9 is an example of the recognition method data in which the partial regions in the teaching object are described hierarchically. "Origin" in the recognition method data in FIG. 9 indicates the shape of the figure surrounding the teaching object (in the example of FIG. 9, the coordinates of two diagonal vertexes of the rectangle surrounding the entire teaching object).

In the recognition method data of FIG. 9, the partial regions "logo" and "prodcut_info" are registered in parallel in the lower hierarchy of "origin" indicating the entire teaching object. The coordinates described on one line of "name" are the coordinates indicating the shape of the figure surrounding the partial region (in the example of FIG. 9, the coordinates of two diagonal vertexes of a rectangle surrounding the partial region). Further, in the recognition method data of FIG. 9, the partial regions "barcode" and "size" are registered in the lower hierarchy of the partial region "prodcut_info".

Although details will be described later, when a plurality of partial regions are hierarchically described in the recognition method data, the object recognition unit 116 executes a stepwise recognition process of performing the similarity determination between the teaching object and the recognition target object for the partial region of the higher hierarchy, and performing the similarity determination between the teaching object and the recognition target object for the partial region of the lower layer only when it is determined that the partial region of the upper layer is similar.

Accordingly, the object recognition unit 116 does not need to perform the similarity determination on the partial region of the lower hierarchy for the recognition target object that is not similar to the teaching object with respect to the partial region of the upper hierarchy, and thus can reduce the amount of calculation related to an object recognition process. In particular, for example, when the partial region that is unlikely to be similar between the teaching object and the recognition target object is positioned at a higher hierarchy, the amount of calculation can be further reduced.

Further, in a case where the partial region of the recognition target object is photographed by the camera 10 every time the similarity determination is performed in each partial region, when the partial regions in which the direction and position of the arm 11 at the time of photographing the partial region are similar are positioned at close hierarchies, it is possible to reduce the amount of operation of the arm 11 at the time of photograph the partial region.

Figure 10:
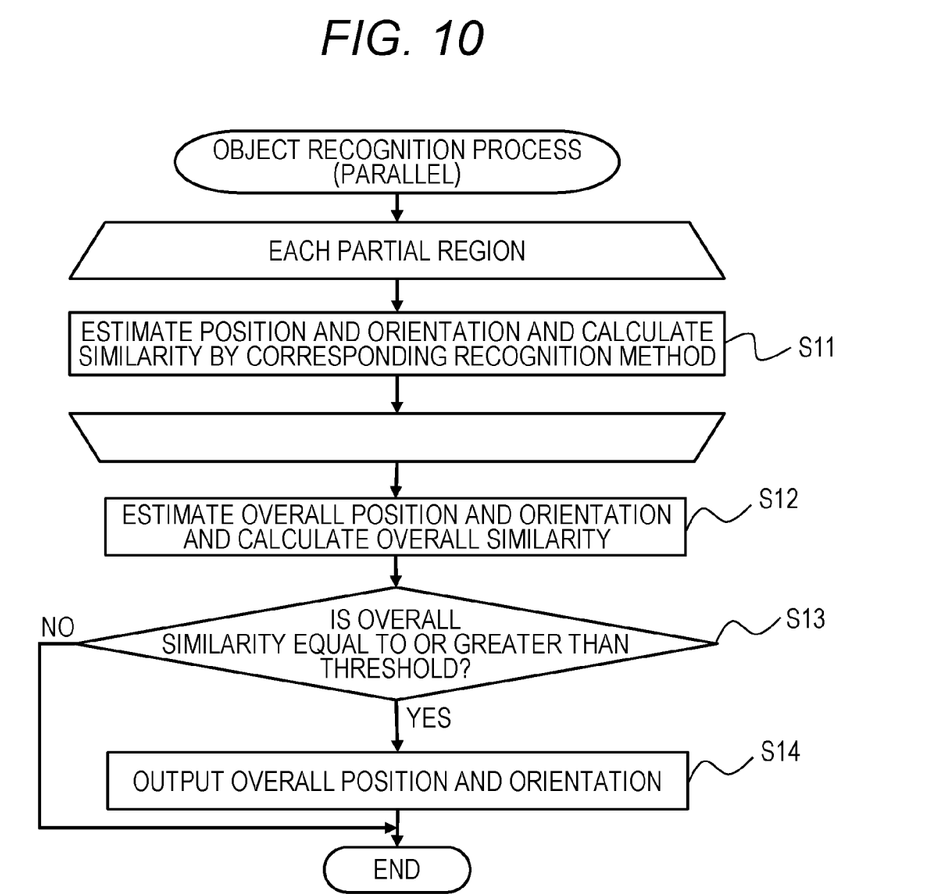
FIG. 10 is a flowchart illustrating an example of an object recognition process in a case where partial regions in the teaching object according to the first embodiment are described in parallel.

FIG. 10 is a flowchart illustrating an example of the object recognition process in a case where partial regions in the teaching object are described in parallel. Before the process in FIG. 10, the object recognition unit 116 acquires the image of the recognition target object from the image acquisition unit 111. Further, the object recognition unit 116 acquires the recognition method data of the teaching object to be compared from the recognition method information 132 before the process in FIG. 10. The object recognition unit 116 executes the process in FIG. 10 in a case where it is determined that the partial regions are described in parallel in the recognition method data of the teaching object.

First, the object recognition unit 116 extracts each partial region from the image of the recognition target object with reference to the recognition method data, and executes the process of step S11 for each extracted partial region. Incidentally, instead of the object recognition unit 116 extracting the image of each partial region from the image of the entire recognition target object, the image acquisition unit 111 may request the terminal 200 to photograph each partial region of the recognition target object with reference to the recognition method data. Incidentally, the photographing of each partial region of the recognition target object may be performed all at once, or may be sequentially executed as a series of processes including photographing of one partial region and the process of step S11 for the one partial region. Incidentally, the processes of step S11 for the partial regions may be executed in parallel.

In step S11, the object recognition unit 116 estimates the position and orientation of the partial region of the recognition target object and calculates the similarity between the partial region of the recognition target object and the partial region of the teaching object based on the recognition method and the parameter corresponding to the partial region indicated by the recognition method data (S11).

Subsequently, the object recognition unit 116 estimates the overall position and orientation of the recognition target object (the position and orientation of the entire recognition target object) based on the position of each partial region estimated in step S11, and calculates the overall similarity between the teaching object and the recognition target object based on the similarity between the partial regions calculated in step S11 (S12).

Specifically, for example, the object recognition unit 116 determines the position and orientation of the partial region in which the simple average of the position and orientation in the partial regions estimated in step S11, the weighted average of the position and orientation in the partial regions, or the similarity calculated in step S11 is maximized as the overall position and orientation. Further, for example, the object recognition unit 116 calculates a simple average, a weighted average, a maximum value, or a minimum value of the similarities between the partial regions calculated in step S11 as the overall similarity.

Subsequently, the object recognition unit 116 determines whether or not the overall similarity calculated in step S12 is equal to or greater than a predetermined threshold (S13). If it is determined that the overall similarity is equal to or greater than the threshold (S13: Yes), the object recognition unit 116 outputs the overall position and orientation estimated in step S12 to the output device 150 via the image display unit 112 (S14), and ends the object recognition process. In this case, the object recognition unit 116 may display, via the image display unit 112, a message or the like indicating that the recognition target object is the same as or similar to the teaching object on the output device 150.

When it is determined that the overall similarity is less than the threshold (S14: No), the object recognition unit 116 ends the object recognition process. In this case, the object recognition unit 116 may display, via the image display unit 112, a message or the like indicating that the recognition target object is not the same as or similar to the teaching object on the output device 150.

Incidentally, without estimating the position and orientation of each partial region of the recognition target object in step S11 and estimating the overall position and orientation in step S12, only when the overall similarity is equal to or greater than a predetermined threshold in step S13, the position and orientation of each partial region of the recognition target object and the overall position and orientation may be estimated before the process of step S14.

Figure 11:
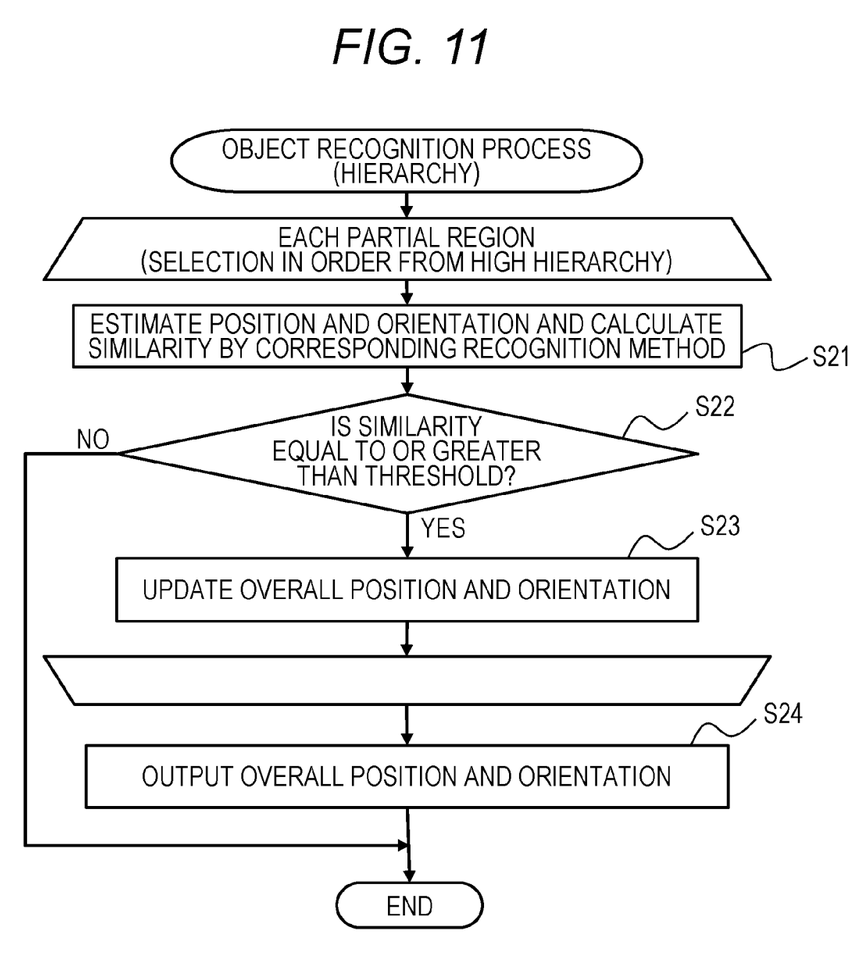
FIG. 11 is a flowchart illustrating an example of the object recognition process in a case where partial regions in the teaching object according to the first embodiment are described hierarchically.

FIG. 11 is a flowchart illustrating an example of the object recognition process in a case where the partial regions in the teaching object are described hierarchically. Before the process in FIG. 11, the object recognition unit 116 acquires the image of the recognition target object from the image acquisition unit 111. Further, the object recognition unit 116 acquires the recognition method data of the teaching object to be compared from the recognition method information 132 before the process in FIG. 11. The object recognition unit 116 executes the process in FIG. 11 in a case where it is determined that the partial regions are described hierarchically in the recognition method data of the teaching object.

First, the object recognition unit 116 extracts the partial regions from the image of the recognition target object with reference to the recognition method data, and executes the processes of steps S21 to S23 on the extracted partial regions in order from the partial region positioned at an upper hierarchy.

Incidentally, instead of the object recognition unit 116 extracting the image of each partial region from the image of the entire recognition target object, the image acquisition unit 111 may request the terminal 200 to photograph each partial region of the recognition target object with reference to the recognition method data. Incidentally, the photographing of each partial region of the recognition target object may be performed all at once, or may be sequentially executed as a series of processes including photographing of one partial region and the processes of steps S21 to S23 for the one partial region.

In step S21, the object recognition unit 116 estimates the position and orientation of the partial region of the recognition target object and the calculates the similarity between the partial region of the recognition target object and the partial region of the teaching object based on the recognition method and the parameter corresponding to the partial region indicated by the recognition method data (S21).

Subsequently, the object recognition unit 116 determines whether or not the similarity between the partial regions calculated in step S21 is equal to or greater than a predetermined threshold (S22). If it is determined that the similarity is less than the threshold (S22: No), the object recognition unit 116 ends the object recognition process while any process of steps S21 to S23 is not performed on even on the partial region where the processes of steps S21 to S23 have not been executed. In this case, the object recognition unit 116 may display, via the image display unit 112, a message or the like indicating that the recognition target object is the same as or similar to the teaching object on the output device 150.

Incidentally, the predetermined threshold may be different for each partial region. Incidentally, for example, even in a case where the object recognition process in FIG. 11 is performed on each of the plurality of recognition target objects, when a partial region exists in which it is determined in step S22 that the similarity is less than the threshold with a predetermined probability or more or the predetermined probability or less, the object recognition unit 116 may output an alert indicating the partial region to the output device 150 via the image display unit 112, for example. Thus, for example, the user can verify whether or not the partial region that is similar with an extremely high probability or the partial region that is dissimilar with an extremely low probability is appropriate as a partial region to be set.

When it is determined that the similarity is equal to or greater than the threshold (S22: Yes), the object recognition unit 116 updates the overall position and orientation of the recognition target object based on the position and orientation estimated in step S21 (S23). Specifically, the object recognition unit 116 determines the position and orientation of the partial region in which the simple average of the position and orientation in the partial regions estimated in the executed step S23, the weighted average of the position and orientation in the partial regions, or the similarity calculated in the executed step S23 is maximized as the overall position and orientation.

When the processes of steps S21 to S23 is ended for all the partial regions, the object recognition unit 116 outputs the overall position and orientation to the output device 150 via the image display unit 112 (S24), and ends the object recognition process. In this case, the object recognition unit 116 may display, via the image display unit 112, a message or the like indicating that the recognition target object is the same as or similar to the teaching object on the output device 150.

Incidentally, for example, at the time of recognizing a partial region in which only character information such as a seal indicating a shoe size or a seal indicating that the article is a sale article is a recognition processing target, and the attaching position has no significant meaning in the partial regions, only the similarity may be considered. For example, in this case, in estimating the overall position and orientation in FIGS. 10 and 11, an average value in which all weights are 0 may be estimated as the overall position and orientation.

Incidentally, although FIG. 10 illustrates a process example when a plurality of partial regions are set in parallel, and FIG. 11 illustrates a process example when a plurality of partial regions are set in a hierarchy, a partial region may be set in a higher or lower hierarchy of a part of the plurality of partial regions set in parallel. In this case, for example, the process in FIG. 11 is performed on the partial regions set in a hierarchy, and then the process in FIG. 10 is performed on the partial regions set in parallel.

Figure 12:
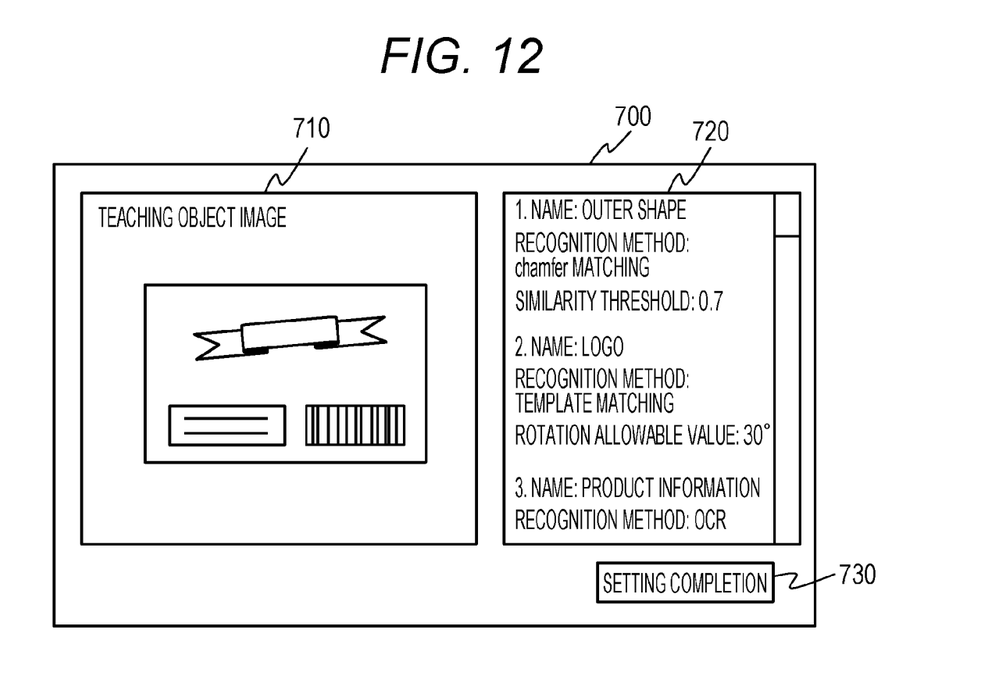
FIG. 12 is another example of the display screen for receiving the selection of the partial region and the setting of the recognition method according to the first embodiment.

FIG. 12 is another example of the display screen for receiving the selection of the partial region and the setting of the recognition method. The difference from FIG. 7 will be described. When the plurality of partial regions are set, a recognition order in the set partial regions can be set in the recognition method setting region 720. The set recognition order is stored in the recognition method data.

For example, the hierarchy of each partial region may be set according to the set recognition order, or the weight corresponding to each partial region may be determined when the overall position and orientation and the overall similarity are calculated by weighted average according to the set recognition order. Accordingly, the user can flexibly change the recognition process according to the characteristic of each partial region.

Figure 13:
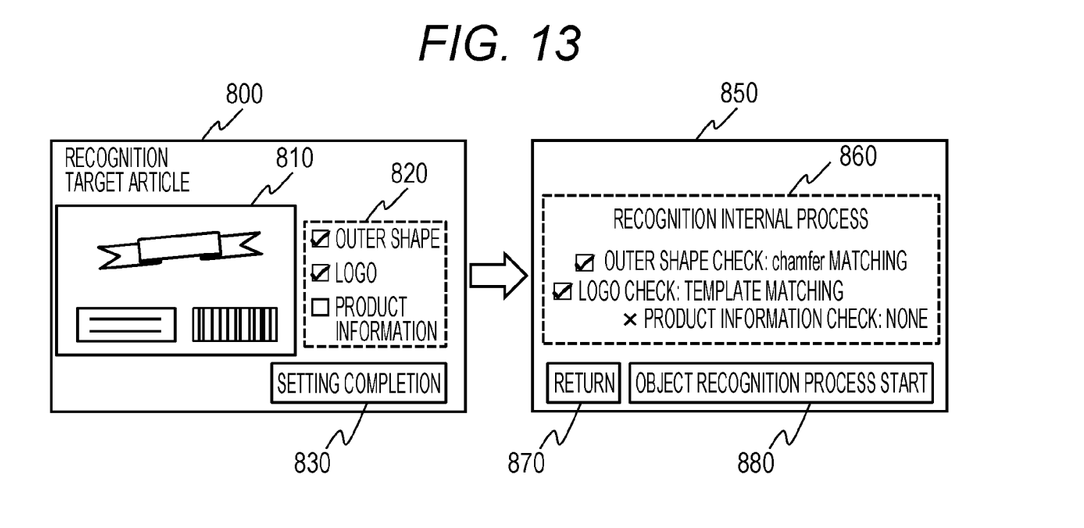
FIG. 13 is an example of a display screen before a start of the object recognition process according to the first embodiment.

FIG. 13 is an example of the display screen before the start of the object recognition process. For example, when the object recognition unit 116 acquires the image of the recognition target object and the information on the partial region of the specified teaching object and the recognition method, the image display unit 112 outputs a display screen 800 to the output device 150. For example, the display screen 800 includes a recognition target article image display region 810, a partial region display region 820, and a setting completion button 830.

The image of the recognition target article is displayed on the recognition target article image display region 810. The names of the partial regions of the specified teaching object and the check boxes corresponding to each name are displayed on the partial region display region 820. Only the partial region for which the check box is checked is the partial region used in the object recognition process.

By providing the check boxes in this way, the user can change the recognition process even at the start of the object recognition process. In particular, the user can select an unnecessary partial region again while viewing the actual image of the recognition target object.

Specifically, for example, it is assumed that a box for storing shoes is a teaching object, and a seal attached to the box is set as the partial region. At the time of the object recognition process, a seal for a limited time (different from the seal at the time of registering the teaching object) may be attached to the partial region of the box which is the recognition target object. In such a case, the object recognition process can be executed without registering the teaching object again by excluding the seal portion from the recognition target as the partial region.

Incidentally, the recognition methods and parameters corresponding to respective partial regions may be displayed in the partial region display region 820. When the setting completion button 830 is selected, the screen transits to a display screen 850 which is an example of a confirmation screen.

For example, the display screen 850 includes a recognition internal process display region 860, a return button 870, and an object recognition process start button 880. In the recognition internal process display region 860, information indicating whether or not each partial region is used for object recognition process, and a recognition method in each partial region are displayed. Note that the parameters of the recognition method may be displayed in the recognition internal process display region 860. When the return button 870 is selected, the screen transits to the display screen 800. When the object recognition process start button 880 is selected, the object recognition process starts.

Figure 14:
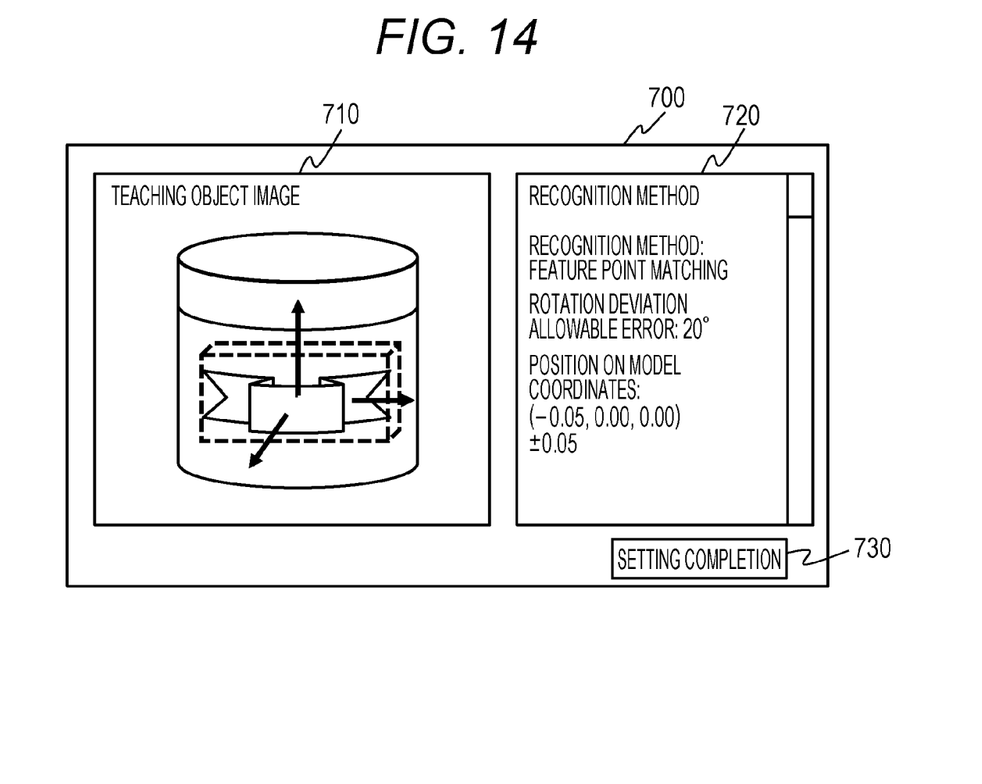
FIG. 14 is another example of the display screen for receiving the selection of the partial region and the setting of the recognition method according to the first embodiment.

FIG. 14 is another example of the display screen for receiving the selection of the partial region and the setting of the recognition method. In the example described above, a two-dimensional object recognition model is used. However, a three-dimensional object recognition model can be used as in the example of FIG. 14. In the example of FIG. 14, three-dimensional feature point matching is adopted as a recognition method.

For example, a two-dimensional object recognition model and a three-dimensional object recognition model may be used together for the same or different partial regions. For example, it is assumed that in the two-dimensional object recognition model, a recognition accuracy is low with a small processing amount while in the three-dimensional object recognition model, the recognition accuracy is high with a large processing amount.

In this case, for example, when the similarity between the teaching object image and the partial region of the recognition target object image by the two-dimensional object recognition model is determined to be equal to or greater than a predetermined threshold, the object recognition unit 116 compares the partial regions by the three-dimensional object recognition model, and when the similarity is determined to be less than the threshold, it may be determined that the teaching object and the recognition target object are not the same or similar objects. Thus, accurate object recognition can be executed with a small processing amount.

Figure 15:
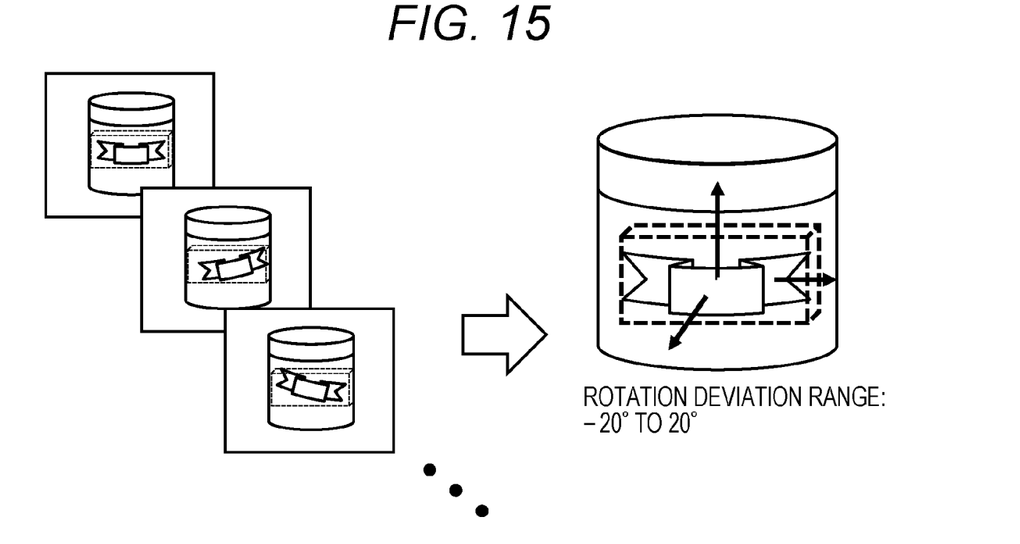
FIG. 15 is an explanatory diagram illustrating an example of an outline of a parameter setting process in recognition method information according to the first embodiment.

FIG. 15 is an explanatory diagram illustrating an example of an outline of a parameter setting process in the recognition method information 132. In the example described above, the parameters are set manually, but some or all of the parameters may be set automatically. In the example of FIG. 15, the rotation deviation allowable error in the feature point matching is automatically set.

In the above-described step S1, the partial region recognition method setting unit 113 acquires a plurality of teaching object images. Then, in step S3, when the recognition method and the same partial region of each teaching object image are specified, the partial region recognition method setting unit 113 sets the rotational deviation allowable error from the rotational deviation of the plurality of partial regions. For example, the partial region recognition method setting unit 113 adopts the maximum deviation, the (weighted) average value, or the like among the rotational deviations of the plurality of partial regions as the rotational deviation allowable error. Therefore, parameter setting by a manual operation of a human is not required.

Note that the present invention is not limited to the above-described embodiments, and various modifications are included. For example, the above-described embodiments have been described in detail for easy understanding of the invention and are not necessarily limited to those having all the described configurations. In addition, a part of the configuration of a certain embodiment can be replaced with the configuration of another embodiment, and the configuration of another embodiment can be added to the configuration of a certain embodiment. Further, it is possible to add, delete, and replace other configurations for a part of the configuration of each embodiment.

Each of the above-described configurations, functions, processing parts, processing means, and the like may be realized by hardware by designing a part or all of them with, for example, an integrated circuit. Further, the above-described configurations, functions, and the like may be realized by software by a processor interpreting and executing a program that realizes each function. Information such as a program, a table, and a file for realizing each function can be stored in a memory, a recording device such as a hard disk and a solid state drive (SSD), or a recording medium such as an IC card, an SD card, or a DVD.

Further, control lines and information lines are described in consideration of necessity for the description, and all control lines and information lines in the product are not necessarily described. It may be considered that almost all the components are connected to each other in actual.

What is claimed is:

1. An object information registration apparatus that registers information of a first object that is a reference object of object recognition, the apparatus comprising:
   a processor;
   a memory; and
   a display coupled to the processor,
   wherein the memory stores a first object image that is an image of the first object and recognition method information related to the first object, and
   wherein the processor is configured to:
   select one or more partial regions included in the first object image,
   set a recognition method corresponding to each of the one or more partial regions,
   acquire feature information of each of the one or more partial regions from the first object image based on the set recognition method,
   store the one or more partial regions, the set recognition method, and the acquired feature information in the recognition method information in association with each other,
   display the first object image on the display device,
   receive input information indicating the one or more partial regions and the recognition method, and
   execute selection of the one or more partial regions and setting of the recognition method based on the input information.

2. The object information registration apparatus according to claim 1, wherein
   the processor is configured to display one or more partial regions and a recognition method indicated by the input information on the display.

3. The object information registration apparatus according to claim 1, wherein
   the memory stores a second object image that is an image of the second object, and
   wherein the processor is configured to:
   acquire the one or more partial regions in the second object image with reference to the recognition method information,
   calculate a similarity of the partial region between the first object image and the second object image for each of the one or more partial regions based on a recognition method and feature information corresponding to the partial region indicated by the recognition method information,
   calculate an overall similarity obtained by integrating the calculated similarities, and
   determine whether the first object and the second object are the same or similar objects based on the calculated overall similarity.

4. The object information registration apparatus according to claim 3,
   wherein the processor is configured to:
   display information indicating the one or more partial regions,
   receive specifying of a partial region as a recognition processing target included in the one or more partial regions, and
   calculate the similarity only for the specified partial region as the recognition processing target.

5. The object information registration apparatus according to claim 1, wherein
   the memory stores a second object image that is an image of the second object, and
   wherein the processor is configured to:
   receive input of order information of the one or more partial regions
   acquire the one or more partial regions in the second object image with reference to the recognition method information,
   select a partial region from the one or more partial regions according to an order indicated by the order information, and
   calculate a similarity of the partial region in the first object image and the second object image in order from the selected partial region, and
   determine whether the first object and the second object are the same or similar objects based on the calculated similarity.

6. The object information registration apparatus according to claim 5, wherein
   when all of the calculated similarities are equal to or greater than a predetermined value, it is determined that the first object and the second object are the same or similar objects, and
   when the calculated similarity is less than the predetermined value, without calculating a similarity for unselected partial regions, it is determined that the first object and the second object are not the same or similar objects.

7. The object information registration apparatus according to claim 1, wherein
a recognition method set for each of the one or more partial regions is capable of allowing an error in at least one of a positional deviation, an inclination, and a size of the partial region.

8. The object information registration apparatus according to claim 7, wherein
the memory stores a plurality of the first object images, and
wherein the processor is configured to:
determine, for a first partial region included in the one or more partial regions, a parameter in a recognition method corresponding to the first partial region by comparing the plurality of first object images, and
store the determined parameter in the recognition method information in association with the first partial region.

9. An object information registration method in which an object information registration apparatus registers information of a first object that is a reference object of object recognition, wherein the object information registration apparatus includes a processor and a memory, and the memory stores a first object image that is an image of the first object and recognition method information related to the first object, the method performed by the processor comprising:
selecting one or more partial regions included in the first object image,
setting a recognition method corresponding to each of the one or more partial regions, and
acquiring feature information of each of the one or more partial regions from the first object image based on the set recognition method,
storing the one or more partial regions, the set recognition method, and the acquired feature information in the recognition method information in association with each other,
display the first object image on the display device,
receive input information indicating the one or more partial regions and the recognition method, and
execute selection of the one or more partial regions and setting of the recognition method based on the input information.

* * * * *